United States Patent [19]

Farrar et al.

[11] 4,455,670
[45] Jun. 19, 1984

[54] X-RAY CASSETTE HOLDER WITH BEAM-LIMITING DEVICE

[75] Inventors: William B. Farrar, Montgomery, Ala.; Don S. Norton, Clinton, Miss.

[73] Assignee: Brell Mar Products, Inc., Jackson, Miss.

[21] Appl. No.: 363,118

[22] Filed: Mar. 29, 1982

[51] Int. Cl.³ .................... A61B 6/14; G21K 1/02
[52] U.S. Cl. .................................. 378/147; 378/170
[58] Field of Search ............. 378/205, 178, 177, 167, 378/147, 170, 152

[56] References Cited

U.S. PATENT DOCUMENTS

| | | |
|---|---|---|
| 2,264,410 | 12/1941 | Schier . |
| 2,903,588 | 9/1959 | Minnich . |
| 2,939,008 | 5/1960 | Goodfriend . |
| 3,115,580 | 12/1963 | Brewer .............................. 378/152 |
| 3,304,422 | 2/1967 | Medwedeff ....................... 378/147 |
| 3,469,099 | 9/1969 | Best et al. ........................ 378/170 |
| 3,521,057 | 7/1970 | Morlan . |
| 3,617,742 | 11/1971 | Schulman et al. . |
| 3,745,344 | 7/1973 | Updegrave ....................... 378/147 |
| 3,792,281 | 2/1974 | Schwartz et al. . |
| 3,864,563 | 2/1975 | Hozumi . |
| 3,930,164 | 12/1975 | Alexander . |
| 4,088,893 | 5/1978 | Schroeder . |

FOREIGN PATENT DOCUMENTS 7030516 1/1972 Fed. Rep. of Germany .
3038548 10/1980 Fed. Rep. of Germany .

OTHER PUBLICATIONS

Advertisement for Denar ACCURAD-100.
Temporomandibular Articulation—X-ray Examination by William J. Updegrave, Dental Radiography & Photography, vol. 26, No. 3, 1953, pp. 41-52.

*Primary Examiner*—Alfred E. Smith
*Assistant Examiner*—T. N. Grigsby
*Attorney, Agent, or Firm*—Cushman, Darby & Cushman

[57] ABSTRACT

An x-ray film cassette holder especially adapted for use in radiography of the temporomandibular joint is disclosed. Slideable horizontal adjustment of the cassette holder is provided by a horizontal tray disposed at a vertically and rotatably adjustable position above a free-standing floor-engaging structure. Ear cannula location holes are provided in the cassette holder opposite the back or reverse side of an x-ray exposure aperture. A special beam limiting device is employed simultaneously to minimize patient x-ray exposure and to facilitate rapid accurate relative placement of the usual weight-balanced x-ray source apparatus.

10 Claims, 10 Drawing Figures

X-RAY CASSETTE HOLDER WITH BEAM-LIMITING DEVICE

This application is related to the copending application Ser. No. 329,138 now abandoned filed Dec. 9, 1981 entitled X-RAY CASSETTE HOLDER naming William B. Farrar as inventor and to a continuation-in-part thereof Ser. No. 363,372 filed concurrently herewith. This application specifically claims the x-ray beam limiting features of the lastest preferred embodiment of the x-ray cassette holder described and claimed in said related applications.

This invention relates generally to x-ray film cassette holders and, more particularly, to a holder that is especially adapted for radiography of the temporomandibular joint although it may be useful for radiography of other portions of the anatomy as well.

Apparatus for proper radiography of the temporomandibular joint has been under development for many years. One earlier known device was devised by Dr. Updegrave. This earlier Updegrave device is essentially a jig placed on a tabletop for holding an x-ray film cassette at a small angle with respect to the horizontal. An ear location projection extending from the upperside of the thus inclined cassette holder was used for physically engaging the adjacent ear canal of a patient's head which was thus forced to lie in a predetermined position with respect to the cassette holder while an x-ray source was positioned above the head of radiography purposes. This device was relatively awkward to use and somewhat painful for the patient due to the awkward required head position and the consistent presence of the ear location projection within the patient's ear canal. The presence of the projection within the ear canal is also believed to often cause displacement of the soft and hard tissues of the temporomandibular joint thus introducing inaccuracies into the resulting radiograph.

Still another prior art x-ray film cassette holder was developed by Dr. William Buhner and is presently marketed by Denar Corporation under the tradename Accurad-100. This device attaches fixedly to an x-ray source so as to hold an x-ray film cassette holder on the opposite side of a patient's head. Another attachment depending from the x-ray source (near the adjacent side of the patient's head first exposed to x-rays) includes two horizontally spaced and adjustable ear auditory canal location rods. The anterior rod engages the auditory canal of the patient's ear (on the opposite side of the head from the temporomandibular joint then being radiographed). The anterior one of the two rods is located so as to provide proper positioning with respect to the patient's right or left ear as the case may be. Here, the angulation between the x-ray source and the x-ray film cassette is fixed. Furthermore, unless this special attachment is left secured to a separate x-ray machine dedicated to this purpose, it must be connected and disconnected each time it is used.

In addition to the above, the weight of the Accurad 100 when attached to the x-ray head disturbs the balance of the extending arm to which the x-ray head is mounted. Therefore the x-ray head will drop and will require a complex, time consuming adjustment to the spring mechanism to restore a weight balance that will allow the x-ray head to stay in a given position. When the Accurad 100 is removed from the x-ray head the weight balance is reversed.

A fairly recently marketed cassette holder is similar to the Accurad 100 but is attached by a cable to the arm of the x-ray head rather than solely to the x-ray head itself. As should be apparent from the above discussion, it would also possess many similar disadvantages.

The present invention is believed to provide a substantial improvement over all such prior art x-ray cassette holders. The present invention provides an x-ray cassette holder which may be useful for radiography of portions of the anatomy other than the temporomandibular joint although it is especially useful for that purpose.

For example, the x-ray cassette holder of this invention may be embodied as a free-standing unit used with the patient seated normally in a conventional dentist's chair. In this free-standing embodiment, the angulation between the x-ray source and the x-ray film cassette may be varied at will and the relative angulation of the patient (achieved through vertical or horizontal rotation of the head with respect to the patient's body) is also freely adjustable without being encumbered, for example, by ear canal locating probes continuously inserted within an ear canal, etcetera. It is also easy to use this device for transpharyngeal radiographs of the temporomandibular joint. This free-standing embodiment of the invention also permits the device to be moved from room-to-room within an office of dentists for use with any one of the normally available x-ray machines without requiring it to be physically connected and disconnected to the x-ray source itself and also without requiring the dedication of any single x-ray source for this purpose.

The portion of the holder which actually receives the cassette is, in the exemplary embodiment, a hollow box-like structure having open ends for receiving the cassette therethrough. This hollow box-like structure is itself slideable along a horizontal tray so that it may be positioned horizontally with respect to the patient by sliding motion along this tray. Vertical adjustment is achieved with respect to a base structure that is stationary with respect to the floor. In the exemplary embodiment, the vertical adjustment structure also permits rotary adjustment about a vertical axis thus giving three dimensions of adjustment after being placed into position adjacent the normal dentist's chair (e.g. by wheeling a free-standing base into position near the side of the dentist's chair).

The exemplary x-ray film cassette holder has an x-ray exposure aperture or location in a panel which may, in some embodiments, comprise an otherwise x-ray impervious panel. However, contrary to some prior devices, the means for more accurately ascertaining relative location of the exposure area with respect to a patient's anatomy is disposed on the opposite or backside of the casette holder so as to provide access to the exposure area or aperture from the back during an initial alignment operation before an x-ray film cassette is inserted. In one exemplary embodiment, a hollow box-like structure is provided for receiving the x-ray film cassette with one of the box sides being x-ray impervious except for the x-ray exposure aperture. On the opposite or backside of the box-like structure, two horizontally spaced holes are provided and positioned such that one of the holes (the posterior one) is always substantially aligned with the patient's adjacent ear canal whenever the x-ray exposure aperture is properly located for radiograhy of the temporomandibular joint.

Preferably, these holes are sized so that an operator's finger can be inserted therethrough (and through the x-ray exposure aperture) to manually locate the auditory canal of the patient's ear (adjacent the temporomandibular joint being radiographed) during the pre-alignment and positioning phase of operation. Once the holder is properly aligned with the patient's anatomy and with the x-ray source, the x-ray film cassette can then be inserted so as to make an exposure in any desired one of the possible locations on the x-ray film. As will be appreciated, this type of ear canal location device permits accurate location of the x-ray exposure aperture with respect to the temporomandibular joint then being radiographed (as opposed to using the ear of the patient on the opposite side) and without requiring a projection to be physically present in the auditory canal during radiography (which can cause displacement of the soft and hard tissues of the temporomandibular joint being radiographed). The ear plugs are also sometimes visible in the radiographs using a superimposed image of the ear plug which creates an artifact in the radiograph.

Another and now preferred embodiment of the invention employs an x-ray beam limiting aperture accurately located with respect to the cassette holder but positioned on the opposite side of the poatient's. head. The x-ray source is then merely positioned adjacent this device to achieve optimum beam alignment with the patient and the x-ray film for a predetermined type of radiograph. In this embodiment, there is no need for an x-ray impervious panel in the box-like portion of the cassette holder since the patient is only exposed to x-rays which are actually used to define a rectangular exposure frame on the film. Thus, the beam limiting device simultaneously performs several valuable functions.

These as well as other advantages and objects of the invention will be more completely appreciated and understood by reading the following detailed description of the presently preferred exemplary embodiments taken in conjunction with the accompanying drawings, of which:

Figures 1, 2:
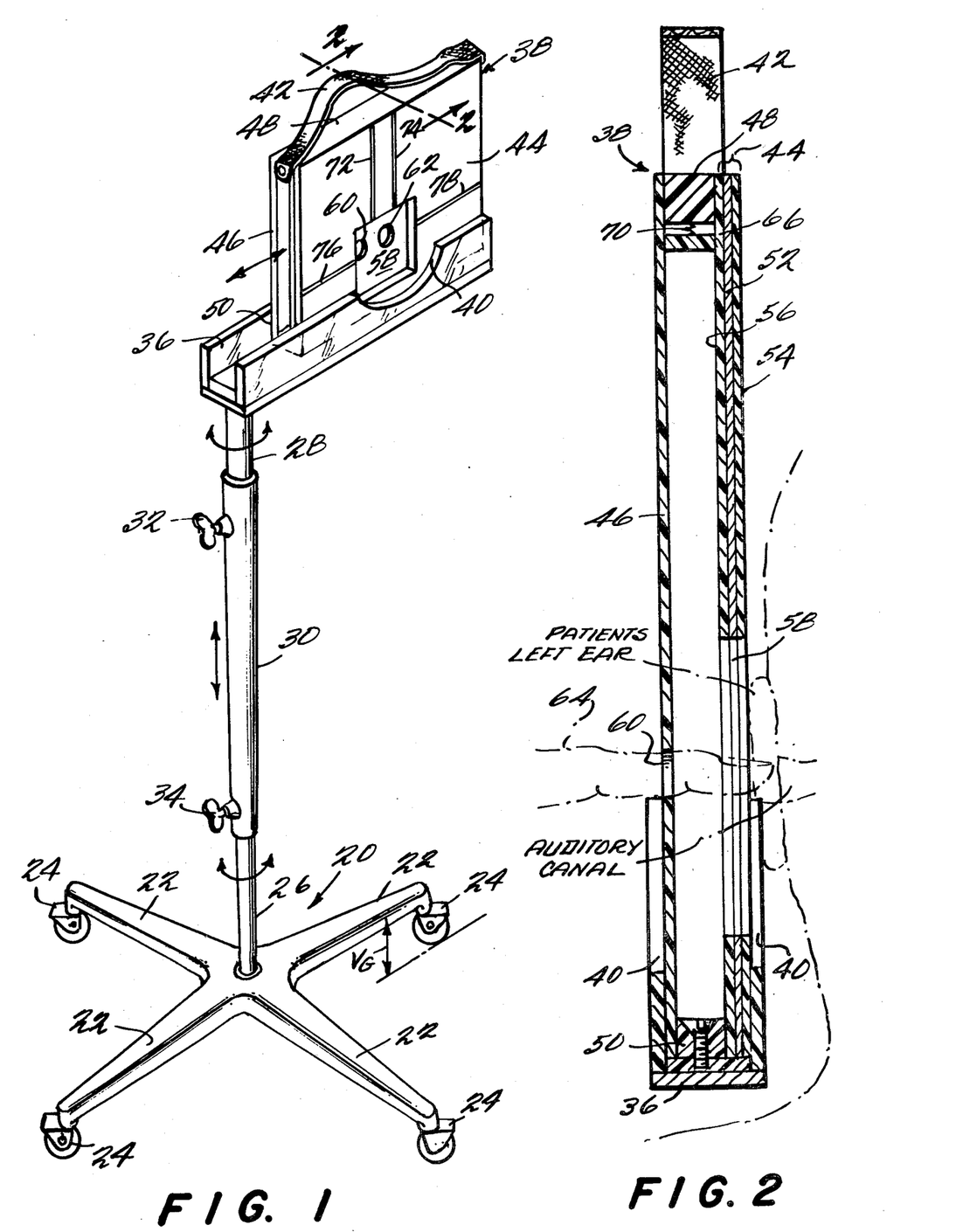
FIG. 1 is an overall perspective view of an exemplary embodiment of the x-ray film cassette holder of Dr. Farrar's prior invention.
FIG. 2 is a cross-sectional depiction of the horizontal tray and hollow box-like structure shown in FIG. 1 which also depicts the initial alignment operation for radiography of the temporomandibular joint.

The presently preferred exemplary embodiment is a free-standing unit as shown in FIG. 1. However, it will be appreciated that the unit might also be adapted to mount on some other piece of furniture or equipment (e.g. the dental chair) which is in turn mounted on the floor.

In the preferred exemplary embodiment, the free-standing floor engaging base 20 has four arms 22 equally and widely spaced apart with casters 24 at the outer ends of each while the inner ends are fixedly secured to a vertical support member 26. The vertical clearance $V_G$ provided under each of the arms 22 is preferably sufficient to clear the base of a dentist's chair as well as the associated foot controls such that the vertical support member 26 may be conveniently and easily positioned immediately adjacent the side of a conventional dentist's chair.

Another separate vertical support member 28 is connected to the vertical member 26 by a vertically adjustable support structure 30. As shown in FIG. 1, the vertically adjustable support structure 30 comprises a sleeve in which both of the members 26 and 28 are rotatably received (i.e., member 28 may be adjusted both vertically and rotatably about a vertical axis) by set screws 32 and 34. If desired, only one of the rods 26, 28 may be made vertically and rotatably adjustable with respect to sleeve 30 or other conventional mechanical arrangements may be used for achieving such relative physical adjustments as should be appreciated.

A horizontal tray or guide 36 is secured to the top of rod 28 and slideably receives a hollow box-like structure 38. Thus, the hollow box-like structure 38 may be horizontally positioned anywhere within the tray 36. In the exemplary embodiment, the tray 36 includes a cut-away portion 40 to permit the positioning of a patient's head substantially adjacent the front side of hollow box-like structure 38.

The hollow box-like structure 38 may be easily removed from the tray 36 by manual engagement of the carrying strap 42 as should be appreciated from FIG. 1. Thus, the x-ray film cassette, if desired for some applications may be loaded into structure 38 before it is positioned within tray 36.

The hollow box-like structure 38 in the exemplary embodiment includes four walls 44, 46, 48 and 50. The two larger side walls 44 and 46 are approximately the same size as the larger dimensions of the x-ray film cassette in use (sized to accommodate 8×10 inch film cassette in the exemplary embodiment). In one embodiment, the front wall or panel 44 is made substantially impervious to x-rays (by embedding a lead panel 52 between plastic panels 54 and 56 as shown in FIG. 2) except for the x-ray exposure aperture 58. The aperture 58 is sized so as to expose a portion of the x-ray film which, in this exemplary embodiment, is approximately one-sxith (4 in. ×3⅓ in.) of a standard 8×10 in. x-ray film. In the presently preferred embodiment of FIGS. 5-10, the front panel need not be impervious to x-rays because a beam limiting device exposes the patient only to x-rays defining the desired film exposure area. However there will be one or more apertures provided in the front wall so as to permit finger access therethrough to properly position the cassette holder as will become aperture below.

As shown in FIG. 1, the x-ray exposure aperture 58 is disposed at the lower central third of the front wall 44 of the hollow box-like structure 38. The opposite parallel back wall 46 is a plastic panel as shown in FIG. 2 having two horizontal spaced holes 60 and 62 which provide rear access to the aperture 58 for the purpose of accurately locating it with respect to a desired portion of the patient's anatomy before loading an x-ray film cassette within one of the two open ends of the hollow box-like structure 38. That is, without an x-ray film cassette in place, an operator's finger 64 (FIG. 2) can be inserted through the posterior one of holes 60 and 62 so as to manually locate the auditory canal of the patient's left or right ear respectively. Although not shown in the drawing, a locking mechanism (e.g. a set screw) may be provided for temporarily fixing the structure 38 with respect to the tray 36 after it has been properly positioned.

Figure 3:
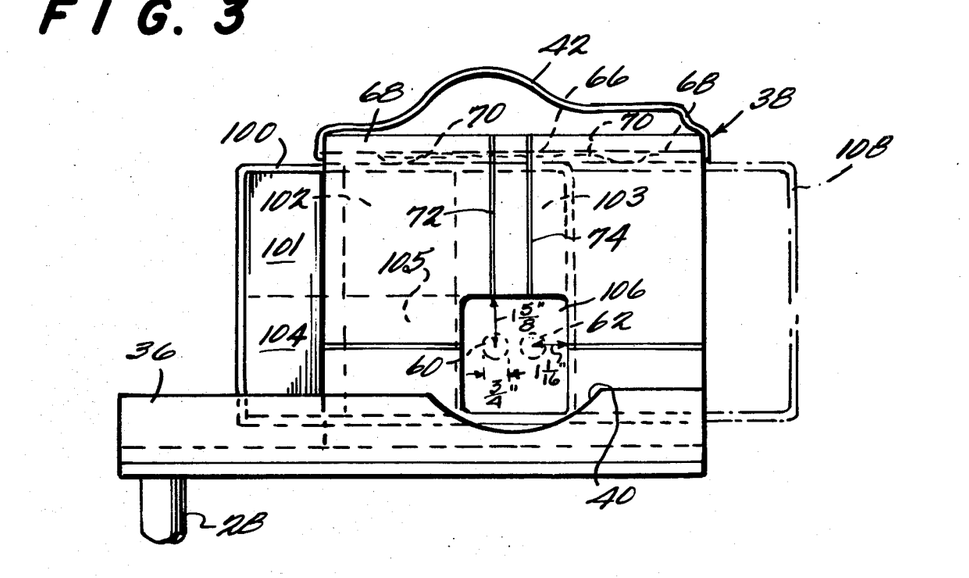
FIG. 3 is a front elevational view of the horizontal tray and hollow box-like structure shown in FIG. 1.
Figure 4:
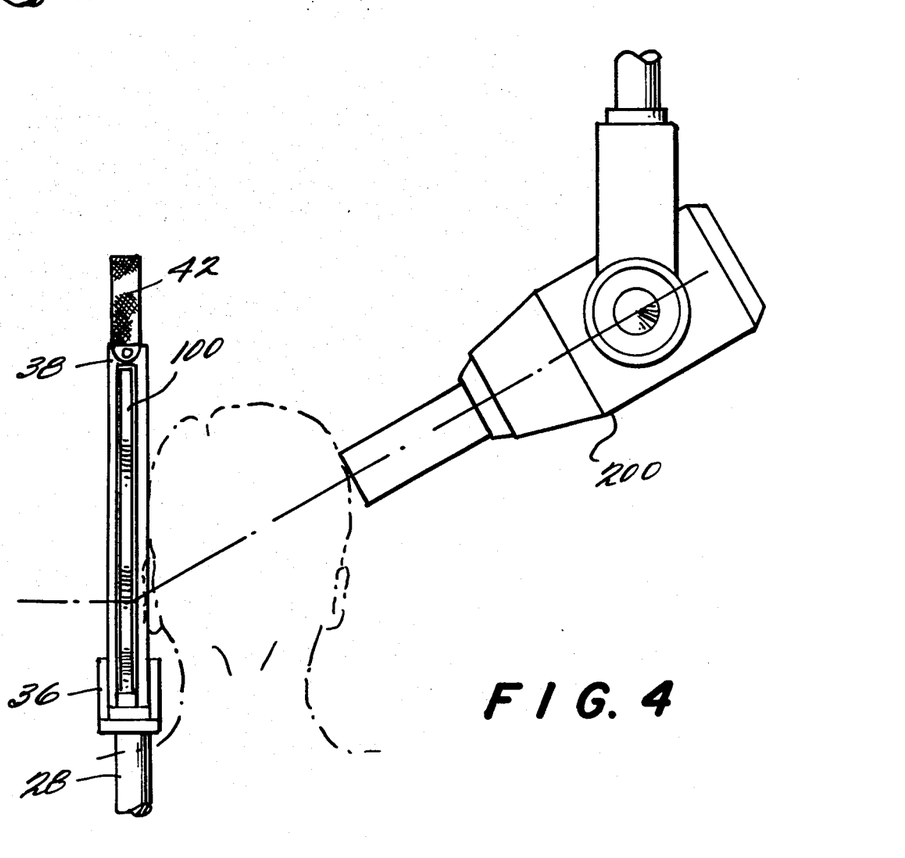
FIG. 4 is a cross-sectional depiction of the exemplary apparatus similar to that shown in FIG. 2 and also illustrating the x-ray film cassette holder during a transcranial oblique projection radiographic exposure of the temporomandibular joint.

Once this initial location process has been achieved (by horizontally sliding the box-like structure 38 within tray 36 and/or by vertically adjusting the positioning of the tray 36 above the floor and/or by rotating the tray 36 so as to be positioned as desired with respect to the patient's head), an x-ray film cassette 100 (FIGS. 3 and 4) is slideably inserted into one end of the hollow box-like structure 38 so as to align a desired one of the six portions 101–106 of the x-ray film with the x-ray exposure aperture 58. As shown in FIG. 3, the x-ray film cassette 100 has been positioned so as to expose the right lower one-sixth 106 of the x-ray film. When positioned so as to expose the left lower one-sixth of the film as seen in FIG. 3, the cassette 100 would be moved to the phantom lines 108 as should now be appreciated.

To provide a slight frictional engagement with the x-ray film cassette holder, a spring-loaded bar 66 is preferably provided inside the hollow box-like structure at its top. The ends 68 of the bar 66 are cam shaped so as to permit the end of the x-ray film cassette to wedge the bar 66 upwardly against the bias force of springs 70. The plastic sides 48 and 50 of the hollow box-like structure 38 correspond approximately in size to the thickness and length dimensions of the x-ray film cassette and are suitably fastened (glue, screws, etcetera) to the plastic rear wall 48 or to the inner plastic portion of the front wall 44 as should be apparent.

Suitable friction means may also be provided within the horizontal tray 36 so as to provide some frictional resistance to sliding motion between the tray 36 and the hollow box-like structure 38 so that it will retain a given position unless a change in adjustment is actually desired by the operator. As also mentioned, conventional locking means may be provided, if desired, for temporarily fixing the structure 38 to the tray 36 after it has been properly adjusted.

In the preferred exemplary embodiment, lines 72 and 74 are scribed on the front surface of panel 44 so as to facilitate horizontal adjustment of the box-like structure 38 with respect to the patient's left and right auditory canal respectively. Similarly, lines 76 and 78 are scribed on the front panel 44 so as to facilitate vertical adjustment with respect to the patient's auditory canal. As should be appreciated, lines 72, 74, 76 and 78 intersect the centers of ear location holes 60 and 62 respectively. Corresponding lines should also be scribed on the back panel 46.

In the bottom of cassette holder box, is preferably a rubber pad that runs length-ways. This will work with the tension bar in the top of the box to secure the cassette. It will also provide a cushion so that cassette won't slide out accidently, but will yet allow an operator to move the cassette to the desired position by pushing on the end of the cassette.

In this exemplary embodiment, the aperture 58 is approximately 4 inches long 33 $3\frac{1}{3}$ inches high and the ear location holes 60, 62 are located opposite aperture 58 in the rear wall 46. As indicated in FIG. 3, these holes are approximately $\frac{3}{4}$ inch in diameter and are each centered approximately $1\frac{3}{8}$ inches from the top of the aperture 58 and approximately 1 1/16 inch from either side of the aperture 58.

After the x-ray film cassette holder of FIG. 1 has thus been properly positioned with respect to a patient, an x-ray source 200 (FIG. 4) may be positioned as desired so as to form a radiograph on the x-ray film adjacent one of the patient's temporomandibular joints. It is believed that the x-ray film cassette holder of this invention might also be adapted for other usages by enlarging the aperture 58 and/or by appropriately changing the location means provided on the opposite or rear side of the aperture 58. For example, it might be possible to take x-rays of portions of a patient's anatomy while the patient is still laying in a hospital bed without requiring movement of the patient to a special x-ray room or the like.

As should now be appreciated, the exemplary embodiment of this invention is supported by a mobile stand which permits it to be moved from room to room so that it may be used while a patient remains seated in a conventional dental chair—which is often extremely important for correct posturing of the mandible when performing radiography of the temporomandibular joint. This exemplary embodiment is also not attached directly to the x-ray source thus avoiding the troublesome need to attach or disconnect the cassette holder each time it is needed and/or the need to tie up an entire x-ray machine for this single purpose.

At the same time, the x-ray film cassette is easily insertable and/or removable from the hollow box-like structure 38 which itself slides horizontally in tray 36 so as to permit horizontal adjustment of the x-ray exposure aperture 58. Vertical adjustment of the aperture 58 is provided, in the exemplary embodiment, by vertical sliding motion between one or both of the vertical rods 26, 28 and sleeve 30 with the final desired vertical position being locked in place by set screws 32, 34. At the same time, 360° rotational adjustment is permitted about a vertical axis between the tray 36 and the base 20 between one or both of the vertical members 26, 28 and the sleeve 30. This permits rotary adjustment of the cassette holder support when the roller base is wheeled into place astride a dental chair, for example. As earlier mentioned, the pedestal roller base 20 provides sufficient vertical clearance $V_G$ of the dental foot controls so as to allow close positioning to the dental chair base and to the patient without requiring continual movement of the foot controls.

The hollow box-like structure 38 of the cassette holder in the FIG. 1 embodiment has a lead shield 52 laminated between two sheets of plastic 54, 56. The x-ray exposure structure 58 is a rectangular opening measuring 4 inches 33 $3\frac{1}{3}$ inches thus permitting six exposures on a standard 8 by 10 inch sheet of x-ray film. As will be appreciated, the laminated lead shield which comprises the front panel 44 of the hollow box-like structure protects the film from being exposed except in the area of the rectangular x-ray exposure opening 58.

The pair of holes 60, 62 in the rear panel 46 of the hollow box-like structure 38 provides convenient means for locating the auditory canal of the patient's left or right ear respectively so as to position the aperture 58 correctly for radiography of the temporomandibular joint. Preferably, this location operation involves the manual insertion of an operator's fingers through the posterior hole so as to locate the ear canal manually. This provides the proper relationship between the film and the temporomandibular joint without introducing an ear plug which can cause displacement of the soft and hard tissues of the joint.

As should be appreciated, any desired relative positioning may be achieved between the x-ray source 200 and the x-ray film cassette using this invention. For example, the cassette holder of this invention may be used for taking both transcranial oblique projections (FIG. 4) or transpharangeal projections of the temporomandibular joint.

Figures 5, 6, 7, 8:
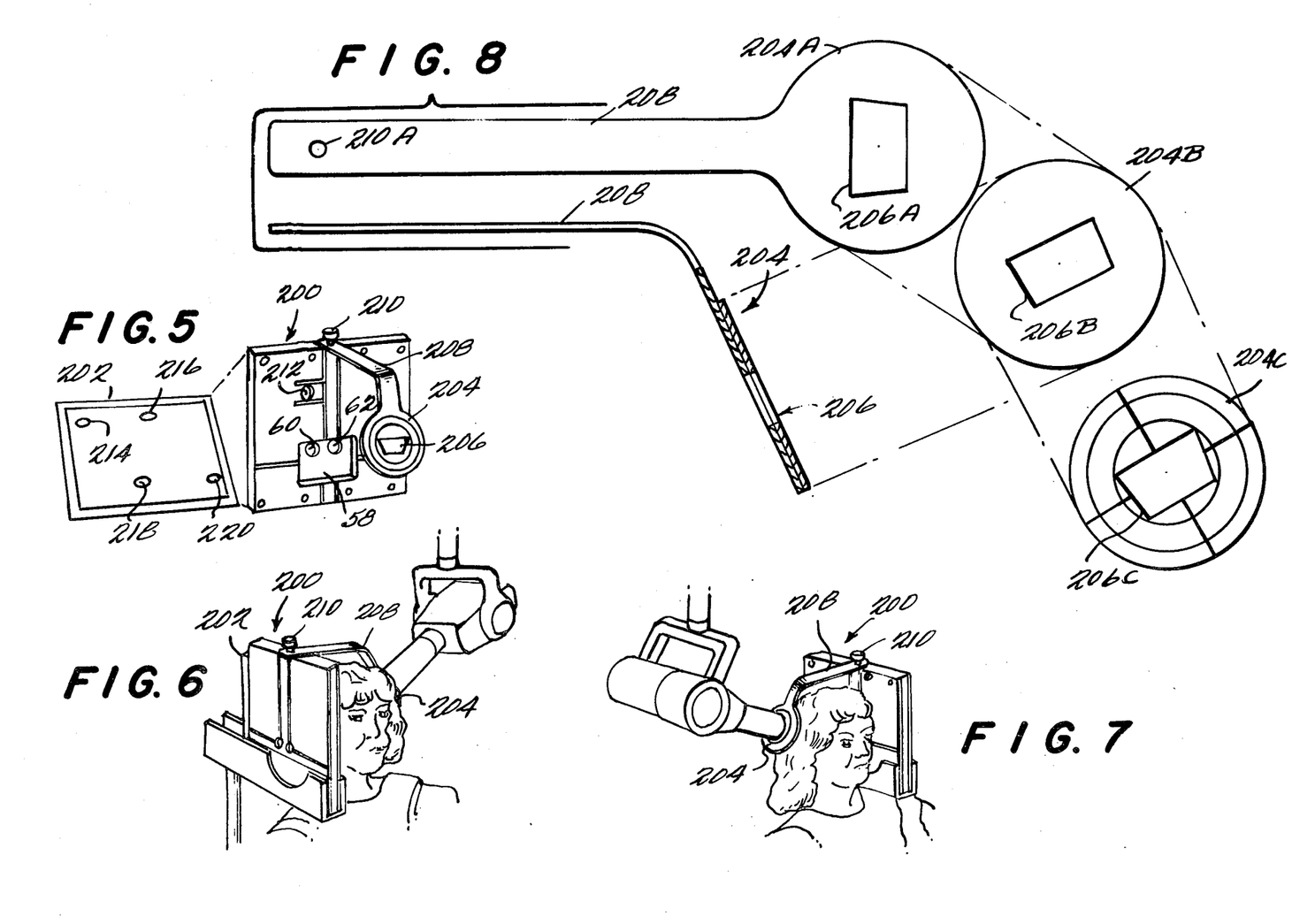
FIG. 5 is a perspective view of the now preferred embodiment of this invention incorporating a beam-limiting device and of an index-marked cassette for use therein.
FIGS. 6 and 7 are perspective views of the FIG. 5 embodiment in use on the right and left sides of a patient's head respectively.
FIG. 8 is an exploded view of the beam limiting device used in the FIG. 5 embodiment.

A presently preferred embodiment of this invention is described and shown in FIGS. 5-10. This embodiment uses the same roller base 20, vertically adjustable support members 26, 28 and 30 and horizontal slide tray 36 as shown in FIGS. 1-4. However, the hollow box-like structure 200 which actually receives the x-ray film cartridge 202 is not required to include any x-ray impervious materials due to the use of a special x-ray beam limiting device 204 which includes suitable x-ray impervious materials (e.g. lead) having an aperture 206 shaped and positioned with respect to the hollow box-like structure 200 so as to expose the patient only to those x-rays which are actually required for exposing the desired exposure area on the film cartridge. As seen in FIG. 5, the beam limiting device 204 includes an arm 208 which is suitably affixed (e.g. by a threaded screw having a knurled finger grip) 210 so that it is positioned on the opposite side of a patient's head from the hollow box-like structure 200.

The preferred embodiment of FIG. 5 is shown in use at FIGS. 6 and 7. Here, it will be seen that the beam limiting device 206 is held at the proper angle on the opposite side of patient's head from the hollow box-like structure 200. Once the patient's head is properly positioned with respect to the hollow box-like structure (as explained above in connection with the embodiment of FIGS. 1-4), then the weight-balanced x-ray source is merely positioned in alignment adjacent to (and flush with) the beam limiting device as shown in FIGS. 6 and 7. Accordingly, without attaching any extra devices or weight to the x-ray head itself or to any of the balanced extension arms which support the head, the x-ray device may be quickly and simply yet accurately and reliably positioned so as to properly expose the temporomandibular joint. At the same time, since the beam limiting device only passes those x-rays which are actually required for exposing the x-ray film, the patient is exposed only to the minimum required x-ray dosage.

In essence, the presently preferred embodiment of FIG. 5 is essentially the same as the embodiment of FIGS. 1-4 except that the x-ray impervious member with the film exposure aperture has been moved from within the front panel of the box-like housing 200 to a position on the opposite side of the patient's head. As just explained, this alteration provides at least two simultaneous advantages. First, it limits the patient's x-ray exposure. Secondly, it permits more accurate and rapid alignment of the unencumbered x-ray generator device for radiography of the temporomandibular joint of the type shown in FIGS. 6 and 7.

In addition, the embodiment of FIG. 5 has been dimensioned so as to produce only four rectangularly shaped x-ray exposure areas on a standard 8×10 inch piece of x-ray film. Furthermore, an exposure number aperture 212 is included and cooperates with markers 214, 215, 218, and 220 on the x-ray cassette 202 so as to reveal when the cassette is properly aligned within the box-like housing 200 for exposing the film on one of these four predetermined areas. As should be appreciated, since the front panel of the box-like housing 200 does not include any x-ray impervious material, the exact size of the aperture 58 in the front panel does not necessarily relate directly to the size of the exposure area on film. However, the aperture 58 should be sized so as to at least permit access of fingers through the ear canal locating hole 60, 62 and it is preferably large enough to encompass the intended x-ray exposure area so as to minimize the possibility of artifacts in the resulting x-ray image. The vertical and horizontal index markings shown in FIG. 5 are of course the same as those shown in the embodiments of FIGS. 1-4.

As shown in FIGS. 5-7 and especially in FIG. 8, the beam limiting device 204 is held at an angle with respect to the vertical (approximately 25°) so as to obtain the correct angle of x-ray passage through the patient's head onto the film plate. Accordingly, if a rectangular x-ray exposure area on the film is desired, then the exposure aperture 206 is preferably trapezoidally shaped as shown in FIG. 8.

As also shown in FIG. 8, the beam limiting device 204 actually comprises three layers of materials 204a, 204b and 204c in this exemplary embodiment. Part 204a is merely a properly bent extension of the positioning arm 208 which includes an aperture 210a at its distal end for mechanical connection to the box-like housing 200. The angulation guide arm comprising the arm 208 and its bent portion 204a, may be formed from one-eighth inch stainless steel, for example. An x-ray impervious member (e.g. a one-sixteenth inch thick lead disk) 204b is employed so as to substantially stop all x-rays from the x-ray source other than those passing through the aligned apertures 206b and 206a, through the patient's head and onto the x-ray film. In the preferred exemplary embodiment, an accurate information label 204c is also affixed to the beam limiting device 204 so as to properly instruct the operators (e.g. that the x-ray generator cone must be properly aligned and flush against the target for proper angulation, etcetera).

Figure 9:
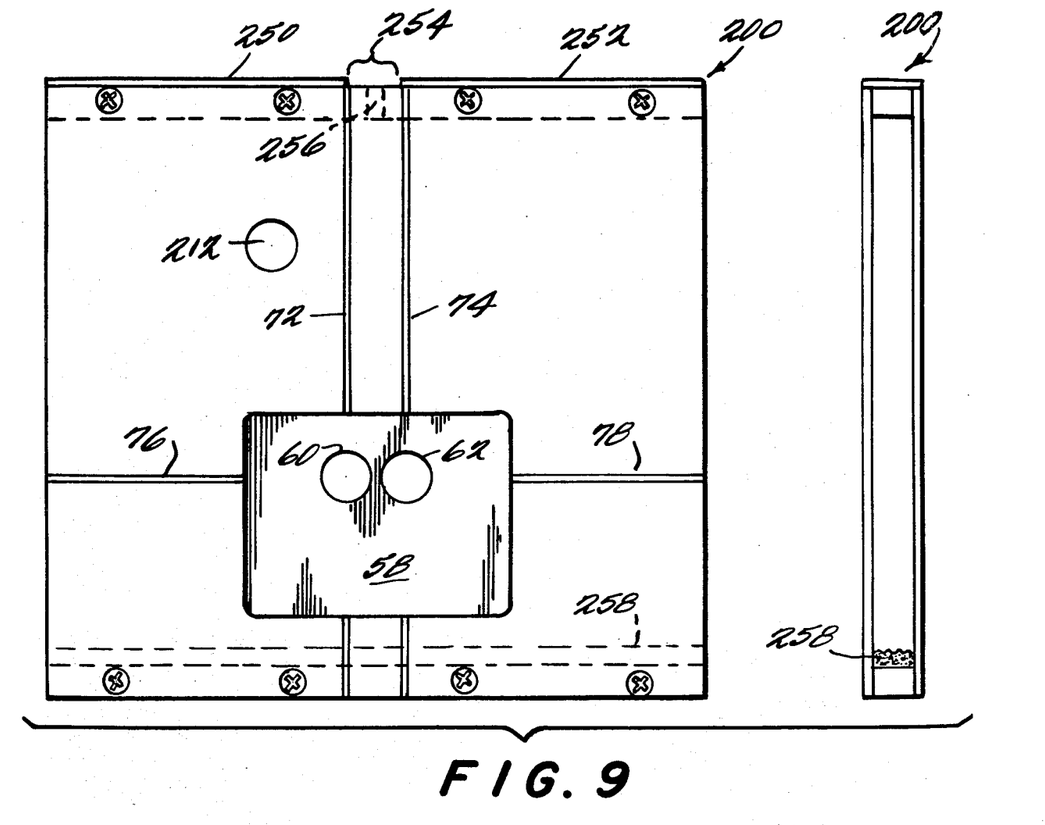
FIG. 9 is an elevation and side view of the box-like portion of the FIG. 5 embodiment detailing the mounting arrangement for the beam limiting device.
Figure 10:
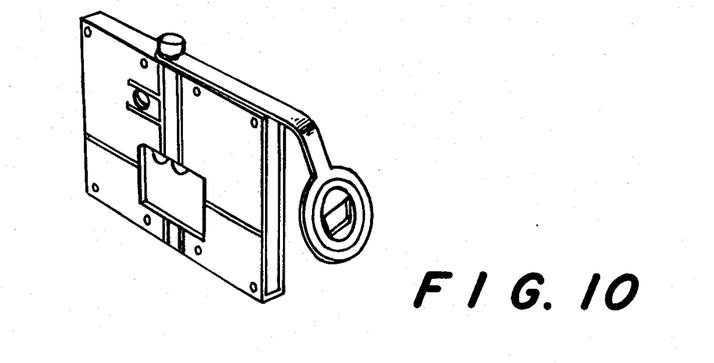
FIG. 10 is a perspective view of the box-like portion of the FIG. 5 embodiment with the beam limiting device in a convenient storage position.

The hollow box-like structure 200 for the presently preferred exemplary embodiment is shown in greater detail at FIG. 9. It is substantially similar in most respects to the hollow box-like structure depicted in the earlier embodiments of FIGS. 1-4 except that the front panel does not necessarily include any x-ray impervious layer as before, the dimensions of the apertures are slightly modified so as to accommodate four exposure areas rather than six on an 8×10 sheet of x-ray film, the exposure number aperture 212, and a mounting arrangement for the angularation guide arm 208 at the top of the housing.

In the latter regard, it will be noted that the top of the housing in FIG. 9 includes plates 250 and 252 which are mounted so as to define a square or rectangular shaped aperture 254 therebetween. At the base of this aperture 254 is a threaded hole 256 into which the threaded end of the knurled knob 210 may be received. As should now be apparent, the aperture 210a in the distal end of the angulation guide arm 208 may be aligned with the threaded hole 256 such that the parallel side edges of the guide arm precisely fit within the parallel edges of aperture 254. Once the guide arm has thus been accurately located with respect to the hollow box-like housing 200, it may be securely fastened in that position with a threaded shaft on the end of a knurled knob 210, etcetera as should be appreciated. In addition, for storage purposes, the knurled knob 210 may be slightly loosened and the angulation guide arm lifted and rotated approximately 90° to the position shown in FIG. 10 so as to take up less storage space. However, this particular arrangement makes it relatively easy to quickly and accurately reassemble the guide arm with respect to the box-like husing in its proper location thus making it ready for use. As previously explained, there is no necessary attachment to the x-ray source or to the delicately balanced arms which hold that source before a radiography of the temporomandibular joint is taken when this apparatus is employed.

Attention is also drawn to the narrow strip of skid resistant rubber 258 which is preferably employed at the lower inside portion of the hollow box-like structure 200 so as to frictionally engage the lower edge of the x-ray film cassette.

While only one exemplary embodiment of this invention has been described in detail above, those ordinarily skilled in this art will recognize that many variations and modifications of this exemplary embodiment may be made while still utilizing many of the novel and advantageous features of this invention. Accordingly, all such variations and modifications are intended to be included within the scope of the following appended claims.

What is claimed is:

1. An x-ray film cassette holder comprising:
   an independent free-standing x-ray film cassette retaining structure for slidably receiving and holding an x-ray film cassette completely externally of a patient's body; and
   an x-ray beam limiting means physically affixed solely to said free-standing retaining structure to be completely supported by the free-standing retaining structure but disposed at a predetermined distance therefrom sufficient to permit the placement of a complete integral portion of a patient's anatomy therebetween while remaining completely external to the patient's body;
   said x-ray beam limiting means including an x-ray impervious planar structure having an x-ray exposure aperture formed therein for passing x-rays to said free-standing retaining structure on the opposite side of the patient's anatomy;
   said x-ray beam limiting means also including
   a structural support member having a first end adjustably affixed to said retaining structure and having a first aperture at a second end; and
   an x-ray impervious member affixed to said second end of the support member and having a second aperture therein aligned with said first aperture.

2. An x-ray film cassette holder as in claim 1 wherein said free-standing retaining structure comprises a box-like structure having two generally parallel side walls and two generally parallel top and bottom walls and mounting means affixed to one of the top and bottom walls for secure and accurate attachment of said beam limiting means thereto and a free-standing floor-supported base structure.

3. An x-ray film cassette holder as in claim 1 wherein said x-ray beam limiting means is disposed at the end of an arm at a predetermined substantially non-perpendicular angle with respect to the arm defining the approximate angle at which x-rays are desired to pass through said aperture for imaging the temporomandibular joint onto x-ray film in said retaining structure when an x-ray source is positioned adjacent and flush with the outside surface of the beam limiting means.

4. An x-ray film cassette holder as in claim 1 wherein said structural support member is an integral shaped sheet of material having an elongated arm extending from said first end to said second end which has a substantially enlarged surface area thereat, said elongated arm including a bend therein at a predetermined substantially non-perpendicular angle with respect to said surface area.

5. An x-ray film cassette holder as in claim 4 wherein said x-ray impervious member comprises a sheet of x-ray impervious material disposed adjacent said enlarged surface area.

6. An x-ray film cassette holder as in claim 1 wherein said structural support member is adjustably affixed to the retaining structure and includes a longitudinal axis which is thereby adjustably aligned with the retaining structure for storage purposes.

7. An x-ray beam limiting device for use with an x-ray film cassette holder and an x-ray source in radiography of a patient's temporomandibular joint anatomy, said beam limiting device comprising:
   an elongated arm member having means for securing it to an x-ray film cassette holder at a predetermined relative position; and
   an x-ray impervious member of generally planar configuration having an x-ray exposure aperture therein for passing x-rays from a first outward side to a second inward side thereof and affixed to said arm member at a predetermined relative position such that a space is defined for insertion of a patient's entire head between said second side and an x-ray film cassette holde when it is secured to said arm member;
   said x-ray impervious member having said first side disploded at a predetermined oblique angle with respect to the x-ray film and the patient's head such that x-rays are passed through said aperture at a proper predetermined x-ray exposure angle with respect to the patient's temporomandibular joint anatomy and to the x-ray film cassette holder when an x-ray source is positioned substantially adjacent said first outward side;
   said x-ray impervious member being supported by an integral extension of said arm member having an aperture therein aligned with the aperture in the x-ray impervious member.

8. An x-ray beam limiting device as in claim 7 wherein said first and second sides are substantially planar.

9. An x-ray film cassette holder comprising:
   an x-ray film cassette retaining structure for slidably receiving and holding an x-ray film cassette; and
   an x-ray beam limiting means physically affixed to said retaining structure but disposed at a predetermined distance therefrom sufficient to permit the placement of a portion of a patient's anatomy therebetween;

said x-ray beam limiting means including an x-ray impervious structure having an x-ray exposure aperture formed therein for passing x-rays to said retaining structure;

said x-ray beam limiting means being disposed at the end of an arm at a predetermined angle defining the approximate angle at which x-rays are desired to pass through said aperture when an x-ray source is positioned adjacent thereto and flush therewith; and said x-ray exposure aperture being trapezoidally shaped so as to define a rectangular x-ray exposure projection at the intended location of an x-ray film cassette when properly positioned within said retaining structure.

10. An x-ray film cassette holder comprising:

an x-ray film cassette retaining structure for slidably receiving and holding an x-ray film cassette; and an x-ray beam limiting means physically affixed to said retaining structure but disposed at a predetermined distance therefrom sufficient to permit the placement of a portion of a patient's anatomy therebetween;

said x-ray beam limiting means including an x-ray impervios structure having an x-ray exposure aperture formed therein for passing x-rays to said retaining structure;

said x-ray beam limiting means including (a) a structural support member having a first end affixed to said retaining structure and having a first aperture at a second end, and (b) an x-ray impervious member affixed to said second end of the support member and having a second aperture therein aligned with said first aperture;

said structural support member being an integral shaped sheet of material having an elongated arm extending from said first end to said second end which has a substantially enlarged surface area thereat, said elongated arm including a bend therein at a predetermined angle with respect to said surface area;

said x-ray impervious member including a further sheet of x-ray impervious material disposed adjacent said enlarged surface area; and a template adjacent said enlarged surface area marked to indicate proper predetermined alignment of an x-ray source therewith.

* * * * *